(12) United States Patent
Brayley et al.

(10) Patent No.: X8860
(45) Date of Patent: Jun. 6, 1835

(54) HULLING CLOVER SEED & RICE

(76) Inventors: Winslow Brayley; Jeremiah Walker

Winslow Brayley & Jeremiah Walker. Philips. Maine

Letters Patent

The Schedule referred to in these Letters Patent and making part
of the same containing a description in the words of the said Winslow Bray-
ley and Jeremiah Walker themselves of their improvement in a
machine for rubbing off the hull from clover seed and also the hull of
rice from the Kernel To all to whom these presents shall come. Be it known that We
Winslow Brayley and Jeremiah Walker of Phillips in the County of Som-
erset and State of Maine have invented a new and improved machine for
rubbing off the hull from clover seed and also the hull of rice from the
kernel and that the following is a full and exact description of the
construction and operation of said machine as invented and improved by
us. The machine is thus constructed. take two pieces of joist stuff or
posts about four inches square each and five feet long. these are of hard
wood and planed smooth. they are placed about ten inches apart and
fixed at this distance from each other by two square bars with tenons passing
through them. from one of these bars to the other there are two strong
cleats of wood nailed or screwed to the bars at each end. through these
cleats of wood there is a hole and a pin inserted which serves as a fulcrum
for an iron lever, the inner end of which reaches to a staple in the moveable
grater hereafter to be described. this lever is the moving power of the ma-
chine. and as it has several holes through it at the end where it receives
the pin or fulcrum there may be given to it a greater or less purchase
according to the strength employed in the operation. upon the outer
sides of the posts and at right angles with them are screwed on two
boards about a foot wide each which gives it the form of a box. but to
complete the box another flat piece of board is applied and is sup-
ported by gudgeons in the centre which renders it stationary. To the
inside of this last piece of board are attached two graters made of sheet iron with holes punched through so as to make them quite rough toward the upper end. there are also three triangular cleets which as well as the graters are placed transversely. and are made exactly to correspond with another set of graters and cleets of similar size and shape soon to be described. The whole box is held together by wooden [illegible] and keys upon the outside. The second set of graters to be described is attached to a piece of plank about five feet long. four inches thick and as wide as the box. or rather it is attached to a piece of board called a spring which covers the said plank. This plank being made smooth is placed inside the Box contiguous to the posts and being thus situated it is moved up and down by the help of the lever before mentioned. touching rollers four in number inserted into the posts to prevent friction. Upon the spring annexed to the other side are six graters made of sheet iron as those above described. they are about two inches wide and are made convex i.e they are bent over slabs of wood which are in the form of sections of cylinders cut lengthwise, the graters are supported by the said slabs placed crosswise & at about three fourths of an inch apart are fastened to the spring of the plank by small nails. At the upper end of the spring are attached six cleets of wood covered on the outside with smooth sheet iron or steel. these cleets are of a triangular shape and placed parallel to the graters and about as far apart as they are. The spring attached to the moveable plank and containing the graters and cleets is thus described. In the first place the plank is made concave resembling the segment of a great circle. the diameter from the chord line to the circumference is about three quarters of an inch. the spring containing the graters &c is a flat piece of board about 3/4 inch thick fastened to the plank at each end and forms the chord line to the curve of the plank. Its use is this, namely when the machine is fed too plentifully. the spring has room by means of the cavity of the plank to give way which prevents it from choking and renders the operation more easy. when the machine is prepared for use, the posts stand a little inclined making an angle of about 40 degrees with a line drawn perpendicular to the plane of the horizon and are supported in this position by two braces one on each side hitched to a pin going through